Nov. 15, 1966  C. S. OCHS  3,285,387
VACUUM HOPPER
Filed March 30, 1965  3 Sheets-Sheet 1
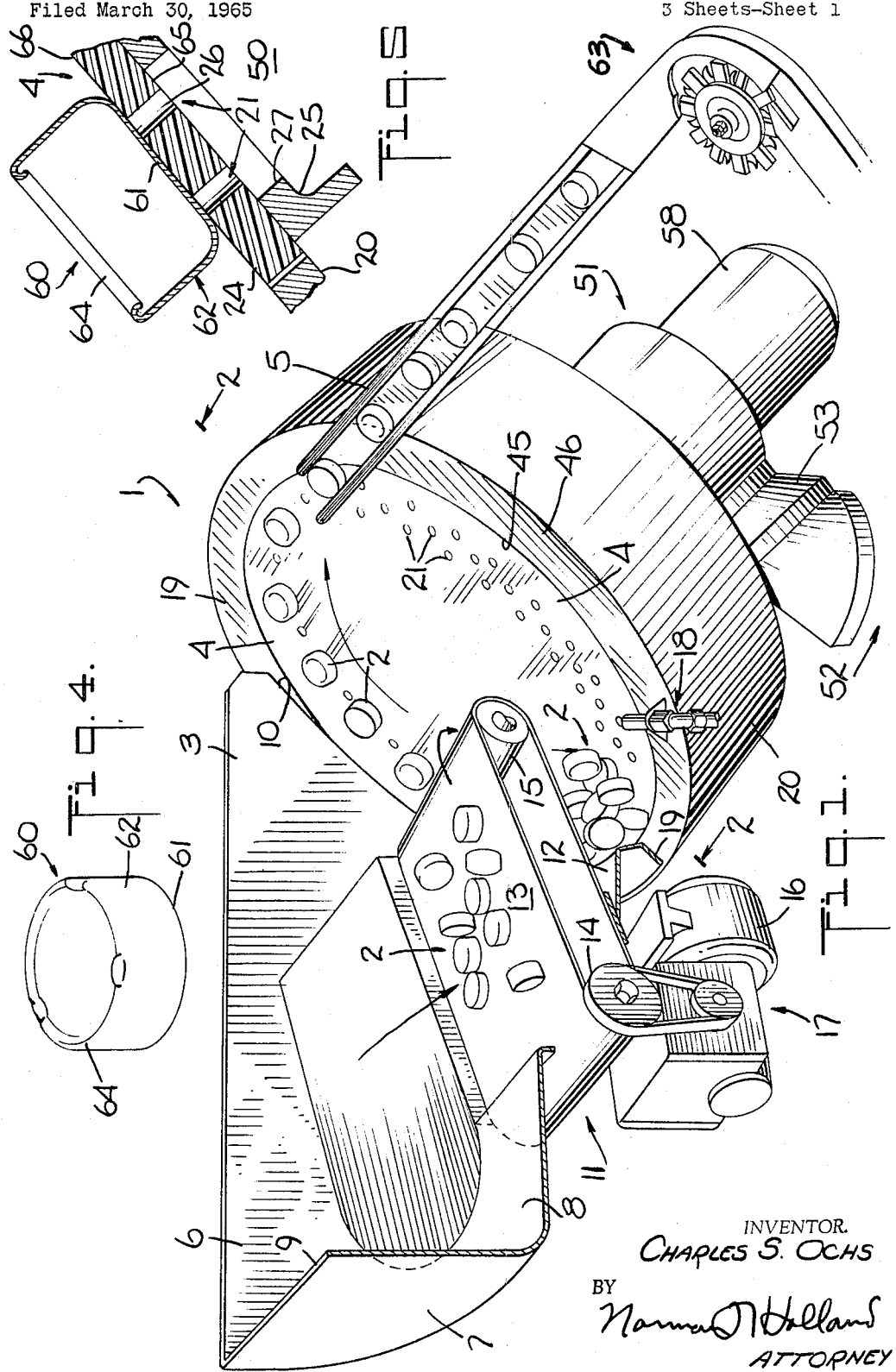
INVENTOR.
CHARLES S. OCHS
BY
Norman T Holland
ATTORNEY Nov. 15, 1966
C. S. OCHS
3,285,387
VACUUM HOPPER
Filed March 30, 1965
3 Sheets-Sheet 2
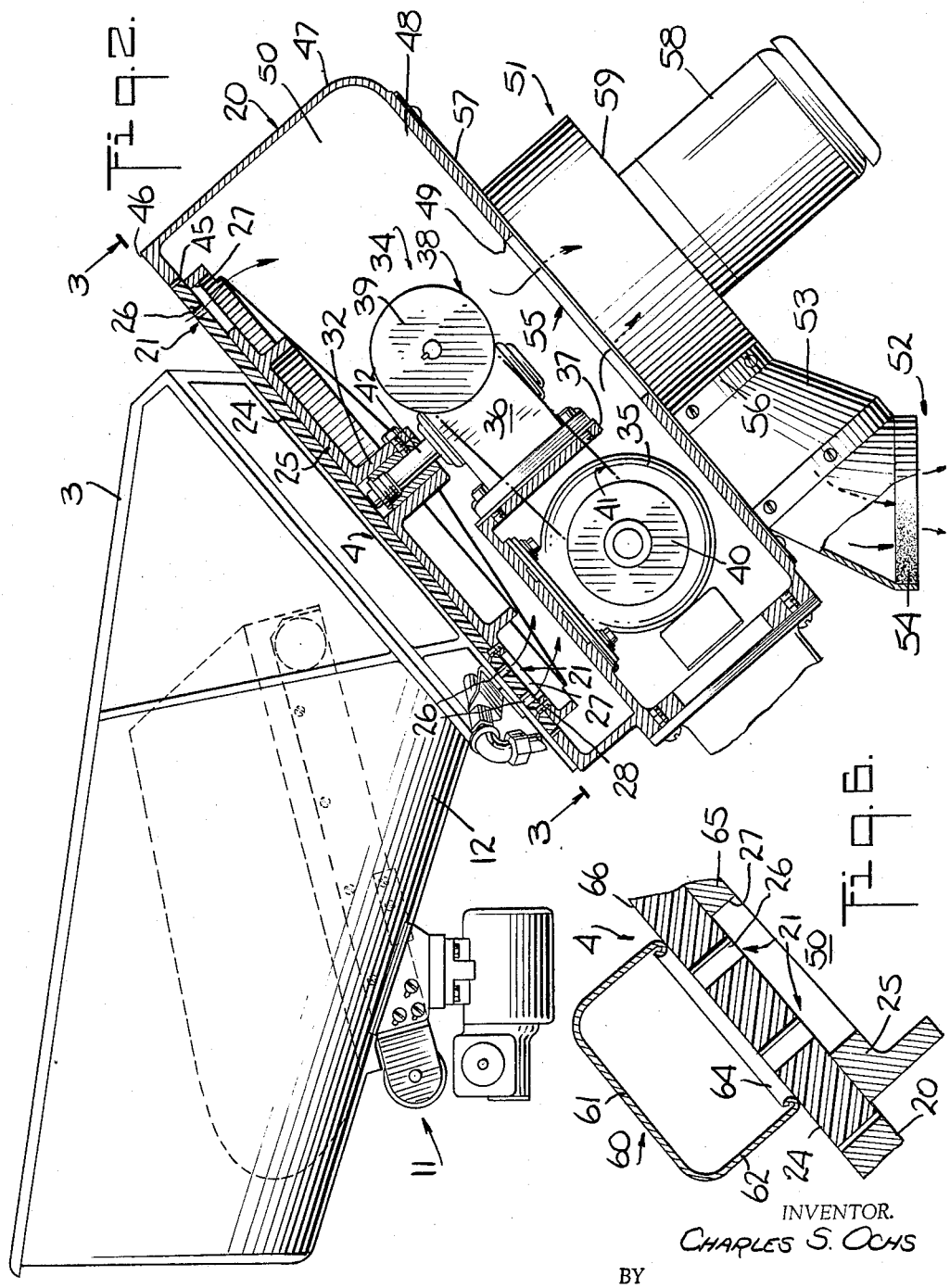
INVENTOR.
CHARLES S. OCHS
BY
Norman M Holland
ATTORNEY

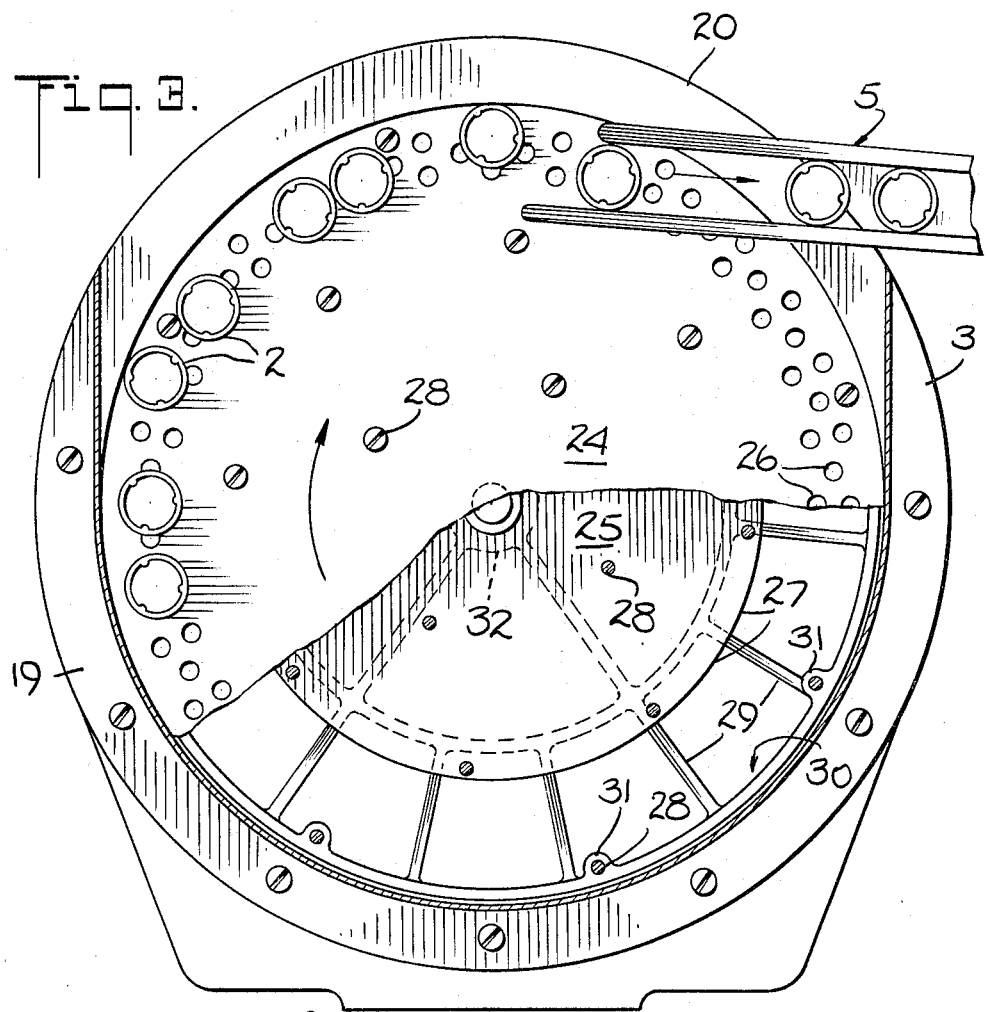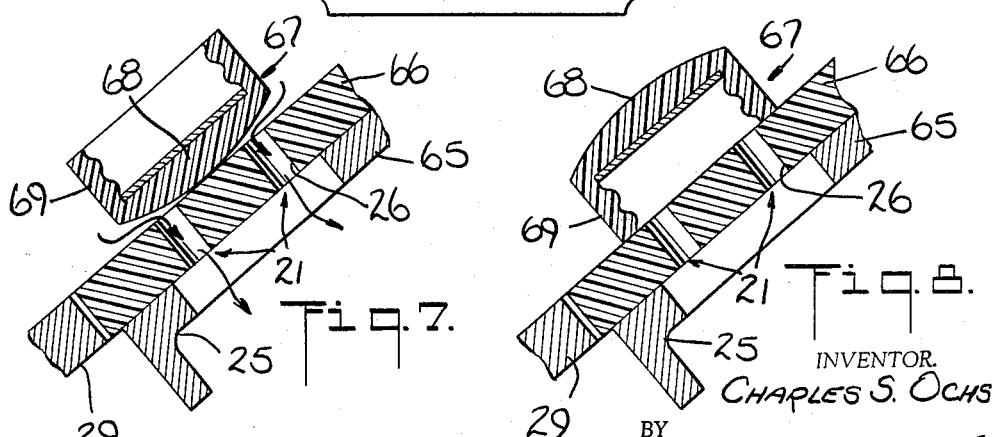

United States Patent Office 3,285,387
Patented Nov. 15, 1966

3,285,387
VACUUM HOPPER
Charles S. Ochs, Lancaster, Ohio, assignor to Anchor Hocking Glass Corporation, Lancaster, Ohio, a corporation of Delaware
Filed Mar. 30, 1965, Ser. No. 443,896
2 Claims. (Cl. 198—33)

The present invention relates to a new and improved hopper for closure caps. More particularly the present invention is directed to a new hopper which can be used not only with ferrous metal closure caps but also with aluminum and plastic caps.

Closure caps are used to seal containers such as bottles or jars which have been filled. In current practice a variety of materials are used for making closure caps to satisfy different packaging requirements. For example, tin plated steel or aluminum may be used for hermetically sealing beer bottles and food jars. Likewise, plastic caps are used for cosmetic containers and the like.

In sealing these containers, hoppers unscramble the closure caps and deliver them at a uniform rate to sealing machines which apply the caps to the containers. Usually the hopper includes a magnetic disc for attracting and unscrambling closure caps for delivery to the sealing machine.

It will be appreciated that magnetic hoppers are limited to closure caps made of ferrous metals and cannot be used with plastic or aluminum closure caps. Thus, it has been necessary to use other hoppers for non-ferrous caps. In one of these hoppers the rotating disc has a series of pockets near its periphery for catching and picking up caps. This arrangement lacks the positive attracting force for closure caps like the magnetic force in magnetic hoppers. Consequently, this other hopper does not unscramble caps as effectively as magnetic hoppers.

The present invention provides a novel hopper which uses a vacuum source for picking up closure caps and delivering them to a sealing machine. Thus the hopper of the present invention may be used with ferrous as well as non-ferrous closure caps. Moreover, the vacuum arrangement according to the present invention provides for a positive attraction of the closure caps to the rotating disc for more efficient and more effective hoppering of closure caps.

Accordingly, an object of the present invention is to provide a hopper which uses a vacuum source for attracting closure caps.

Another object of the present invention is to provide a hopper which is capable of attracting and unscrambling ferrous as well as non-ferrous closure caps.

A further object of the present invention is to provide a hopper which eliminates clustering of closure caps on the rotating disc.

A still further object of the present invention is to provide a hopper which provides for a quick and orderly procession of closure caps.

Another object of the present invention is to provide a vacuum hopper with which specific types of closure caps may be attracted to the rotating disc in a predetermined orientation thereby eliminating the need for re-orienting some caps after hoppering.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the present invention has been chosen for purposes of illustration and description and is shown in the accompanying drawings, forming a part of the specification, wherein:

FIG. 1 is a perspective view, partially cut away, showing the hopper of the present invention;

FIG. 2 is a side elevational view of the hopper according to the present invention with a section taken along line 2—2 of FIG. 1;

FIG. 3 is an elevational view along lines 3—3 of FIG. 2 showing the outer face plate of the rotating disc partially broken away to expose its support wheel;

FIG. 4 is a perspective view of a closure cap which may be used in connection with the hopper;

FIG. 5 is a sectional view showing a closure cap of FIG. 4 as it is attracted by the rotating disc;

FIG. 6 is a sectional view illustrating a closure of FIG. 4 being hoppered in a different position from the cap illustrated in FIG. 5;

FIG. 7 is a sectional view illustrating a closure cap in such position as will not be attracted by the hopper of the present invention; and FIG. 8 is a section view corresponding to FIG. 7 illustrating a closure cap in such position as it will be attracted and held by the hopper of the present invention.

Referring to the drawings and more particularly to FIG. 1, the preferred arrangement of the hopper according to the present invention is illustrated. The hopper 1 receives closure caps 2 in a storage bin 3 and unscrambles the caps by means of a rotating disc 4 for delivery to a sealing machine (not shown) by way of a suitable chute or selector indicated at 5.

The storage bin 3 may be of any suitable type such as that disclosed in copending application Serial No. 228,618 filed October 5, 1962, now Patent No. 3,185,285 and owned by the assignee of the present invention. Such a storage bin comprises side walls 6, back and bottom walls 7 and 8, and an open top 9. The front end of the storage bin is open at 10 for accommodating the rotating disc 4. The storage bin 3 may also include a feed conveyor 11 for delivering the closure caps 2 to a lower compartment 12 adjacent the rotating disc 4. The feed conveyor 11 is preferably inclined and comprises an endless belt 13 mounted on a pair of rollers 14 and 15 driven by a suitable motor 16 and transmission 17. The delivery of the closure caps by the conveyor 11 may be controlled by a sensing device 18 which responds to the level of caps in the lower compartment 12 as is disclosed in said copending patent application. The storage bin 3 is mounted by suitable means such as an outwardly directed flange 19 (FIGS. 1 and 3) near the periphery of a housing 20 which supports the rotating disc 4.

After the feed conveyor 11 delivers the caps to the lower compartment 12 the caps are now in position for hoppering. During the hoppering operation the caps 2 are drawn to and held upon the rotating disc 4 by a vacuum source. That is, the caps are picked up and held on the rotating disc 4 by means of a low-pressure chamber located behind the rotating disc. For this purpose the preferred rotating disc 4 has a series of air passages 21 near its periphery. The air openings communicate on the one hand with the storage bin 3 where caps are ready for hoppering and with a low-pressure chamber in the hopper housing 20. Thus a draft of air flowing through the passages 21 in the disc pulls and holds the caps over the passages in the rotating disc 4.

Referring now to FIG. 2, the rotating disc 4 may be of any suitable construction but preferably comprises an outer face plate 24 mounted on a supporting wheel 25. Both the face plate 24 and the wheel 25 have air openings 26 and 27 respectively near their outer peripheries. As best seen in FIG. 3, the openings 26 in the plate may be staggered and overlie the relatively larger openings 27 in the wheel 25. The face plate 24 may be secured to its wheel 25 by suitable means such as screws 28. I have found it preferable to use a sheet of plastic material such as Textolite by General Electric Co. for the face plate. It will be understood that an annular slot near the periphery of the disc may be used in lieu of the air openings 26.

The supporting wheel 25 may be of suitable construction. The air passages 27 in the wheel are bound by radial ribs 29 and a peripheral rim 30. Bosses 31 on the rim 30 accommodate the face plate retaining screws 28. The supporting wheel 25 and hence the entire disc 4 are supported for rotation by a central hub 32 in engagement with a suitable driving mechanism located within the hopper housing 20, and shown best in FIG. 2.

A typical drive mechanism 34 for rotating disc 4 comprises a suitable motor 35 and gear system 36 mounted upon a supporting bracket 37 within the hopper housing 20. Preferably a belt drive 38 including a pair of sheaves 39 and 40 and a belt 41 interconnects the motor 35 and the gear system 36. The wheel 25 is fitted by its hub 32 upon an output shaft 42 of the driving mechanism 34.

The drive mechanism 34 supports and rotates the disc 4 within an opening 45 in the front wall 46 of the hopper housing 20. In addition to the open front wall 46, the housing further comprises a side wall 47 which is preferably cylindrical on a rear wall 48 with an air opening 49. Thus the hopper housing 20 defines an interior chamber 50, which when maintained at an air pressure lower than atmospheric, induces a flow of air through the air passages 21 in the rotating disc 4. The flow of air so produced pulls and holds closure caps 2 to the disc face during the hoppering operation.

The interior chamber 50 of the housing 20 is maintained at low pressure by any suitable vacuum source. Typically, the vacuum source includes a blower 51 for withdrawing air from the chamber 50 and discharging it at a convenient point 52 by means of a suitable duct 53 and filter 54. The path of air is shown by the arrows in FIG. 2. The blower 51 may be of any suitable kind and preferably is a centrifugal blower which takes suction at its center 55 and discharges the air near its periphery 56 into the duct 53. The blower casing may be attached to the hopper housing 20 by a flange 57. A motor 58, mounted on the blower casing 59, drives the blower.

While the present invention may be used with any style closure cap, the operation of the vacuum hopper will now be described with particular reference to the closure cap 60 illustrated in FIG. 4. The closure cap comprises a top panel 61 and a depending skirt portion 62. The lower edge 64 of the skirt is rolled in and has a number of lugs for securing the cap to a container (not shown).

As shown in FIG. 1, the closure caps are fed by a conveyor 11 into the lower compartment 12 of the storage bin 3 adjacent the rotating disc 4. The blower 51 draws air through the face of the disc 4 for discharge at a convenient point 52. The flow of air through the face of the disc and the hopper housing 20 creates a pressure differential between the lower 65 and upper 66 faces (FIG. 5) of the disc. As the disc 4 (FIG. 1) rotates the caps are picked up and held by the pressure differential for delivery to a suitable chute 5 near the top of the disc. During the hoppering operation, the caps may be oriented on the upper face 66 of the rotating disc as shown in FIGS. 5 and 6. In FIG. 6, closure cap 60 has been picked up with its opening or lower skirt portion 64 toward the disc. In both cases the pressure differential holds the caps on the disc because one side of the cap is exposed to the lower pressure existing within the housing chamber.

Generally it is desirable to feed closure caps in the same orientation to the sealing machine. For this purpose a selector 63 (FIG. 1) such as disclosed in the Roberts et al. Patent No. 3,095,957 dated July 2, 1963, and owned by the assignee of the present invention, may be used to turn over the caps which have been picked up with their top panels toward the rotating disc as shown in FIG. 5.

One of the advantages of the present invention is the selective hoppering of certain types of closure caps. That is to say, certain types of closure caps are unscrambled by the vacuum hopper in the same orientation. Such caps are characterized by an uneven top panel or an uneven skirt portion such as a crown closure. Caps with uneven top panels may be have domed or grooved tops as is well-known in the art. In FIG. 7, I have illustrated a cap 67 having a domed top panel 68 and a depending skirt 69. The cap 67 in FIG. 7 presents itself with its domed top 68 toward the face of the rotating disc. As shown by the arrows, air passes around the dome and the cap is not held by the rotating disc. FIG. 8 on the other hand illustrates the same cap 67 being picked up with its depending skirt 69 toward the face of the rotating disc. This cap is picked up in the same manner as described above in connection with the cap illustrated in FIG. 6. Thus, some closure caps can block passage of air through the disc only in one orientation as in FIG. 8. These caps will be picked up by the hopper in a uniform orientation and no selector is required.

Another of the advantages of the present invention is the cleaning effect of the vacuum hopper on closure caps. In operation the vacuum hopper removes dust and other extraneous material present on the surface of closure caps being fed. For example, closure caps supplied to the vacuum hopper have usually been packed and transported in cartons and will sometimes have a residue of carton dust on their surfaces. Thus the present invention provides a vacuum hopper which not only can feed closure caps but also removes extraneous surface material so that cleaner closure caps are fed to a sealing machine. The dust and other matter removed from the closure caps during the feeding operation is removed from the air stream by means of the filter 54 illustrated in FIG. 2.

It will be seen that the applicant has provided a novel selector for use with closure caps without regard to the materials used in making the caps. The selector may be used with plastic or aluminum as well as ferrous metal type closure caps. The hopper may include a disc face such as a plastic material for preventing abrasion and marring of closure caps. The performance of the selector hopper is much improved because the differential pressure force of the air holds only one layer of caps against the disc. Clustering of caps which occurs in a magnetic hopper is avoided. The hopper may also be used for selective hoppering of closures such as those having domed top panels.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A hoppering apparatus for closure caps comprising a generally cup-shaped housing providing a vacuum chamber, a perforate wheel rotatably mounted in said housing at substantially the rim thereof, a face plate detachably secured to said wheel covering said chamber and provided with a series of perforations about its margin, motor means for rotating said wheel and face plate, a blower connected to said housing for exhausting air from said chamber, means for feeding caps to said face plate for adherence to the margin thereof by air entering the chamber through the perforations in the face plate and wheel, and cap removing means having a surface engageable by caps adhering to said margin for directing said caps successively off the face plate.

2. A hoppering apparatus as claimed in claim 1 in which the face plate is formed of plastic material for preventing abrasion or marring of the closure caps.

References Cited by the Examiner

UNITED STATES PATENTS 2,941,653    6/1960    Kriemelmeyer    198—165
3,209,888    10/1965    Sterling    198—33

EVON C. BLUNK, *Primary Examiner.*

RICHARD E. AEGERTER, *Examiner.*